United States Patent

[11] 3,622,769

[72] Inventors Peter A. Lajoie
Chelmsford, Mass.;
Jack W. Skinner, New Kensington, Pa.

[21] Appl. No. 862,717
[22] Filed Oct. 1, 1969
[45] Patented Nov. 23, 1971
[73] Assignee Allegheny Ludlum Steel Corporation
Pittsburgh, Pa.

[54] ANALOG-TYPE RESISTANCE PROGRAMMABLE COUNTER
9 Claims, 4 Drawing Figs.

[52] U.S. Cl. .......... 235/183, 235/92 PC, 235/92 NT, 235/92 PB, 307/220, 307/271, 324/113, 328/49
[51] Int. Cl. .......... G06g 7/06, G06g 7/18
[50] Field of Search .......... 235/183, 92 PC; 324/113; 367/271

[56] References Cited
UNITED STATES PATENTS
2,873,388 2/1959 Trumbo .......... 235/183 X
3,287,640 11/1966 Rehage .......... 324/113
3,531,633 9/1970 Johnson .......... 285/183

*Primary Examiner*—Malcolm A. Morrison
*Assistant Examiner*—Felix D. Gruber
*Attorneys*—Richard A. Speer, Vincent G. Gioia and Howard R. Berkenstock, Jr.

ABSTRACT: An electric analog counter which in its basic assembly includes a pulse former, a pluse accumulator and an output generator wherein the pulse accumulator includes an external variable program resistor whose value is preselected to control the rate of accumulation of an electric charge in said accumulator thereby varying the number of pulses, or counts, necessary for the pulse accumulator to trigger the output generator which signals the completion of the counting event. In a preferred embodiment a delay and filter section and a trigger section are incorporated within a input signal conditioner which preconditions the inputs to cause the counter respond only to input signal counts and not to extraneous noise signals.

INVENTORS.
PETER A. LAJOIE &
JACK W. SKINNER
By Howard R. Berkenstock Jr.
Attorney INVENTORS.
PETER A. LAJOIE &
JACK W. SKINNER
By Howard R. Berkenstock Jr.
Attorney

ANALOG-TYPE RESISTANCE PROGRAMMABLE COUNTER

BACKGROUND OF THE INVENTION

This invention relates to a readily programmable counter; that is, one which may be rapidly and conveniently programmed to a new counting program. With the advance of automation in industry, the industrial electronics field has seen increased use of electrical counters. Conventionally, these counters are built up from a basic unit which has two degrees of freedom, such as an on-off switch. These switches, known as flip-flops, are coupled so that a second actuates only after a first is fully actuated; thus the second switch will move only half as often as the first. Addition of more flip-flops may divide the counting rate still further. In conventional counters this rate of counting is divided or decreased until a manageable quantity is arrived at and this value recorded either mechanically or utilized for further electronic triggering. It will be noted by those who are familiar with the art that in order to change a counting rate it is necessary to change the arrangement of flip-flops, which in reality controls the counting rate. In order to change the arrangement of flip-flops, it is necessary to make interconnection changes within the electrical circuitry of the counter. Thus, the conventional counter requires substantial modification in its circuitry in order to reprogram the apparatus to perform a different count.

SUMMARY OF THE INVENTION

This invention relates to a programmable counter of greater flexibility providing a variable resistance section within the counter, the adjustment of which permits rapid and convenient alteration of the program count. The invention includes an electric counter having electronic means to generate a standard pulse output of constant width and amplitude responsive to a pulsed input signal; a pulse accumulator responsive to the pulse output, the accumulator having an integrating capacitor coupled with a variable count program resistance to regulate the rate of counting charge accumulation by the capacitor; and a single-acting signal generating means responsive to the pulse accumulator to produce an output signal upon the accumulation of a predetermined counting charge by said integrating capacitor.

DESCRIPTION OF THE PREFERRED EMBODIMENT

Figure 1:
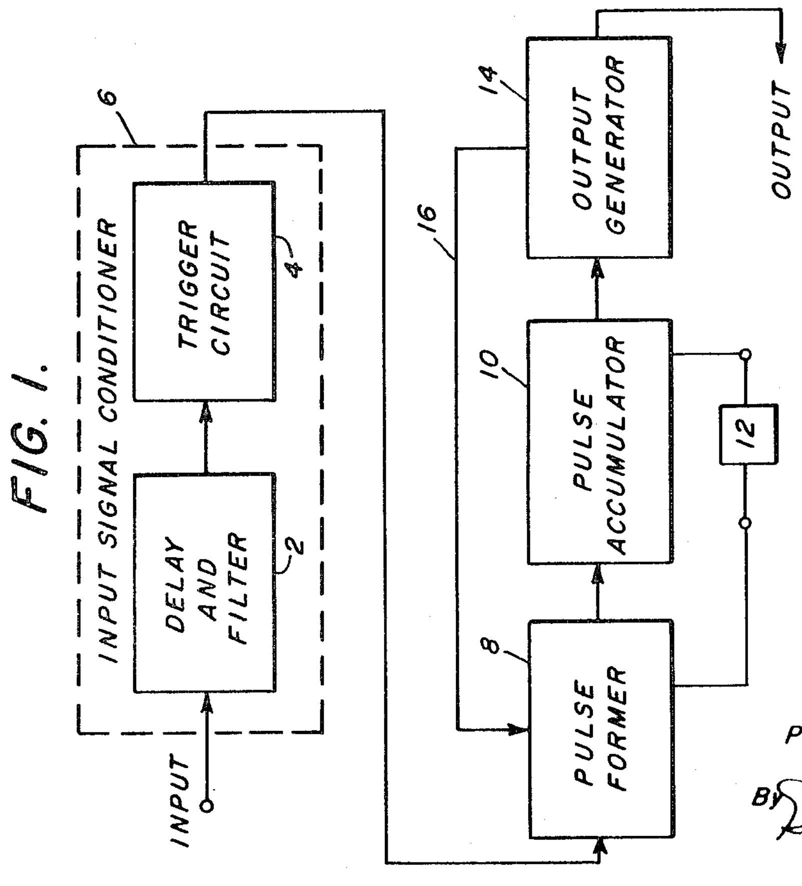
FIG. 1 is a block diagram of the functional elements of the invention.

Referring now to the drawings, specifically to FIG. 1, reference numeral 2 indicates a delay and filter section which receives a signal from an external input. The filter portion of the section 2 serves to prevent false triggering of the invention from noise contained in the output signal and the delay portion of the section operates to eliminate the effect of contact bounce if a relay or switch closure is utilized to produce the input signal. Connected to delay and filter section 2 is trigger circuit 4 which provides the required trigger spike to actuate the electronic counter of our invention. The delay and filter section 2 and the trigger circuit 4 make up input signal conditioner 6 which also may shape the input signal to a usable form. Signal conditioner 6 is included in the preferred embodiment of our invention and is not essential to the operation of the counter, providing the input is from a noise-free pulse source capable of triggering the electronic counter reliably.

The electric counter of our invention includes a pulse former 8, which supplies a standard pulse i.e., one of predetermined amplitude and duration, to a pulse accumulator 10. This standard pulse former provides a source of energy which is uniformly repeatable for every input trigger signal to the electronic counter. The accumulator 10 stores a given electrical charge for each pulse produced by pulse former 8 in response to the input. External programming element 12 connected to pulse accumulator 10 is in the preferred embodiment, a variable resistance device such as a plug-in resistor or a "pot" which controls the amount of charge stored in accumulator 10 for each pulse produced by former 8. When the quantity of the stored energy within accumulator 10 reaches a predetermined level, the accumulator 10 dumps the stored energy into the output generator 14 which produces an output signal representing the completion of a given count. A feedback loop 16 from the output generator to the pulse former 8 assures that no energy is stored in the accumulator 10 during the signaling of completing a count event. This is accomplished by cutting off the pulse former during the forming of the final pulse of a given count the instant that the output generator signals the accomplishment of the given count. Without feedback loop 16, a one-count error would be inherent within the counter.

Figure 2:
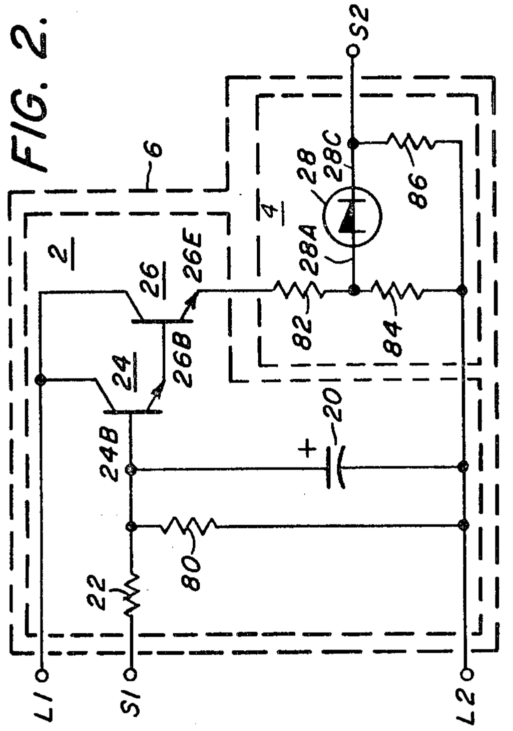
FIG. 2 is a schematic diagram of the signal input conditioner.

Referring now to FIG. 2, terminals L1 and L2 represent the power supply terminals for the input signal conditioner 6. In the preferred embodiment a 30-volt B+ supply is utilized. An input signal representing the event to be counted is supplied to terminal S1 which charges capacitor 20 through resistor 22. "-Plus" side of capacitor 20 is connected to base 24B of transistor amplifier 24 which is coupled to transistor amplifier 26 in a Darlington connection, through base 26B. Such a connection allows emitter 26E to follow the voltage charging capacitor 20 while not loading down capacitor 20. The transistor couple 24 and 26 supply a triggering device 28 such as a forward breakover diode. In the preferred embodiment when the anode 28A of diode 28 reaches trigger level (approximately 12 volts for the type M4L 3054 device), diode 28 switches to an "on" state, causing the voltage at cathode 28C to rapidly rise to a positive level providing a trigger spike at terminal S2.

Figure 3:
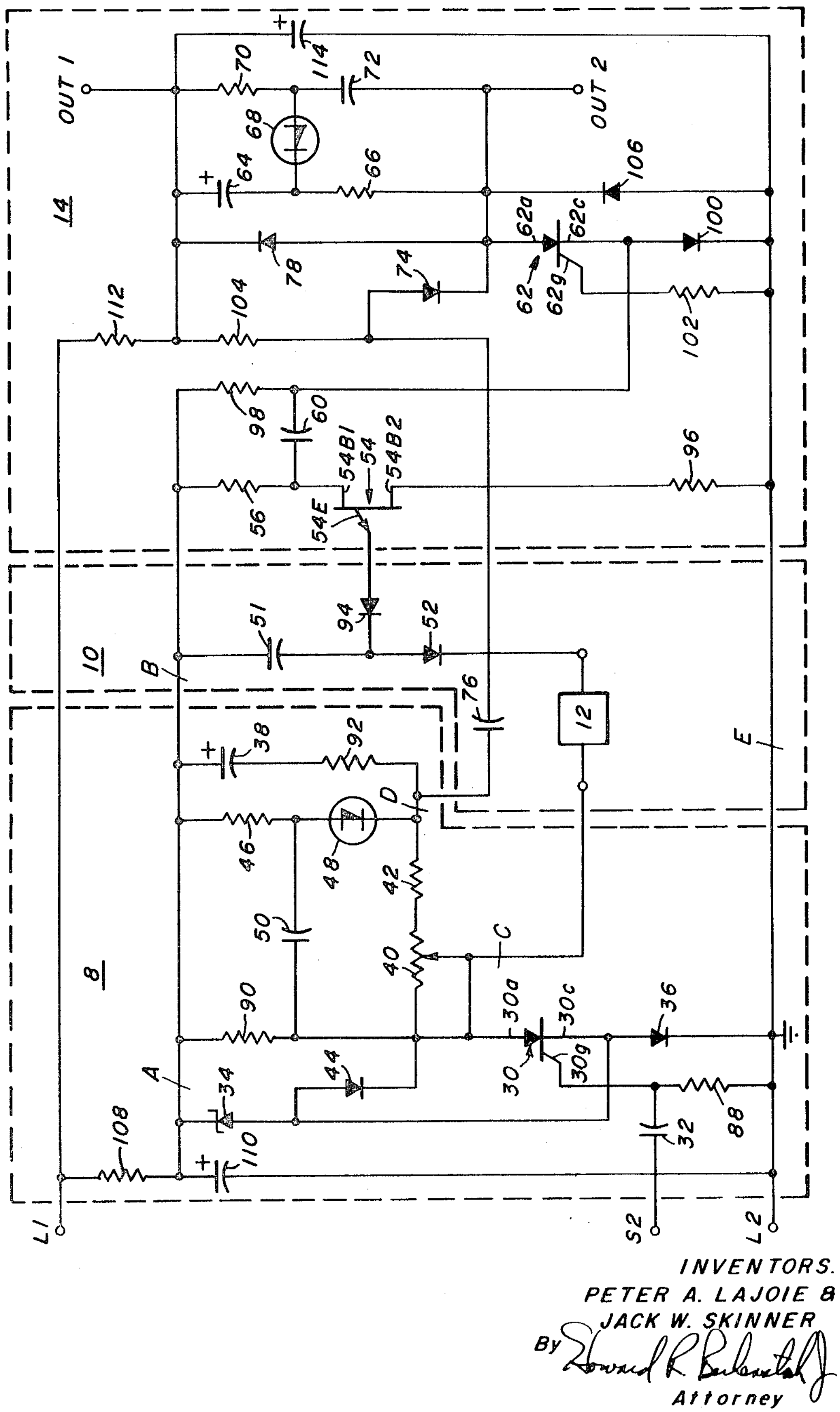
FIG. 3 is a schematic diagram of the basic electronic counter of our invention.

Referring now to FIG. 3 which schematically illustrates pulse former 8, pulse accumulator 10 and output generator 14, it will be seen that a trigger spike at terminal S2 triggers a latching switch 30, such as semiconductive controlled rectifier (type 2N5061 in the example). The triggering spike applied to gate 30G through capacitor 32 (0.1 microfarad) of the SCR turns it on and brings the anode voltage of approximately 20 volts in the preferred embodiment at 30A down to approximately 2 volts. This anode voltage is applied at supply terminals L1 and L2 and is regulated by a Zener diode 34 (such as a 1N474A) coupled to a blocking diode (such as a 1N4001). Switching of SCR 30 to an "on" condition causes capacitor 38 (1 microfarad) to charge up through pulse-adjusting resistors 40 and 42 and blocking diode 44 until forward breakover diode 48 switches on. In the example, resistors 42 and 40 are 10 and 20 kilohms respectively and diode 44 is a 1N4001. When diode 48 switches on a negative going spike is formed by the discharge of capacitor 38 through a resistor 46, such as a 100-ohm resistor in the example and through diode 48 which may be a M4L3054 type. This negative spike is coupled to anode 30A through capacitor 50 which in the example is a 0.1 microfarad capacitor. This negative spike applied to the anode of SCR 30 switches the SCR off and thereby terminates the pulse interval. The SCR 30 being supplied by regulated voltage provides an "on" condition or a pulse of a constant height. The timing action of resistors 40 and 42, plus capacitor 38, provide an "on" duration or pulse of a predetermined width. It may be seen that a standardized pulse is thus generated within the pulse former 8.

Referring now to accumulator section 10 of FIG. 3, the accumulator capacitor 51 such as a 1-microfarad capacitor, is coupled through a blocking diode 52, such as a 1N3595 to the variable program resistor 12. Accumulator capacitor 51 is coupled to output generator 14 through a signal generator 54 such as a unijunction transistor (type D5K1). Since each pulse from the pulse former 8 is initiated by switch 30 to a standard height and width, the amount of charge entered into capacitor 51 for each single pulse is determined by the value of variable programming resistor 12 and the capacitor 51. Since capacitor 51 is of a constant value, the variable resistor 12 becomes the controlling element. By selecting an appropriate resistance at 12, a given number of pulses each containing a known electrical charge, will be required to charge capacitor 51 to a sufficient level to switch generator 54 to an "on" state. When the electrical charge on accumulator 51 reaches the trigger level of the signal generator 54, transistor 54 switches into conduction and discharges accumulator 51 into load resistor 56, such as the 100-ohm resistor in the example.

Referring further to output generator 14 illustrated in FIG. 3 it will be seen that generator 54 is coupled through a capacitor 60 to a latching switch 62, such as the SCR type 2N5061. The spike produced by generator 54 discharging into load 56 produces a negative spike at the cathode 62C of switch 62, causing the switch to go to an "on" state which brings voltage at anode 62A down from the B+ supply level (approximately 30 volts) to approximately 2 volts. This reduction of voltage causes a capacitor 64, such as a 15-microfarad capacitor, to charge up through a resistor 66 (68 kilohms). Capacitor 64 is coupled to a forward breakover diode 68 (a type M4L3054) which in turn is coupled to a resistor 70 and a capacitor 72 having values of 100 ohms and 0.1 microfarads, respectively, in the example. The charging of capacitor 64 allows breakover diode 68 to reach its breakover voltage thereby discharging into resistor 70. The negative spike generated by the breakover of diode 68 is coupled back through capacitor 72 to anode 62A. The coupling of the negative spike to anode 62A serves to turn off switch 62 and thereby terminate the output of generator 14. Switch 62 is also coupled at anode 62A through a blocking diode 74 (1N4001) and a coupling capacitor 76 (0.1 microfarad) to diode 48. When switch 62 switches "on" a negative pulse generated at anode 62A which is coupled back to diode 48 through 74 and 76, causing diode 48 to breakover and supply a pulse to anode 30A of switch 30. This functions to shackle the pulse former 8 during the signaling of the accomplishment of a count such that additional pulses will not be formed in switch 30 of pulse former 8, which might charge pulse accumulator 10. It will be recognized by those skilled in the art that without this feedback, line 16 on FIG. 1, a one-count error would be introduced into pulse accumulator 10 during the signaling of the counting event. A blocking diode 78, such as a 1N4001, and diode 74 prevent feedback from breakover diode 48 to switch 62 during the counting operation.

Additional components complement the embodiment disclosed in FIGS. 1 through 3 which enhance the operation circuit. In FIG. 2 resistor 80 (82 kilohm) serves to discharge capacitor 20 when the input is removed clearing the capacitor to receive another input signal to be "counted." Resistor 82 (220 ohms) limits current to breakover diode 28 when its fires to trigger switch 30. Resistor 84 (12 kilohms in the example), keeps emitter 26E from floating when the breakover diode is in the "off" state. Resistor 86 (680 ohms in the example) provides a current path to hold diode 28 "on" when triggered. Resistor 88 coupled to gate 30G keeps the gate from floating. Diode 36 provides a positive bias on cathode 30C to render it insensitive to false triggering. Diode 44 prevents anode 30A from going negative with respect to power supply common, L2. Resistor 90 (1.8 kilohms) provides a load for SCR 30 to establish the necessary holding current. Resistor 92 (27 ohms) prevents the reset pulse supplied through diode 74 and capacitor 76 from being shorted out by the inherent capacity of capacitor 38. Diode 52 and diode 94 prevent leakage or discharge of capacitor 51 between counts. Resistor 96 (680 ohms) provides a bias source for transistor 54 through base 54B2. Resistor 98 (27 kilohms) serves as a return path for capacitor 60 and as a bias feed for a blocking diode 100 (1N4001 to keep cathode 62C positive when it is not being triggered. Resistance 102 (680 ohms) keeps the gate 62G from floating and provides a current path for the firing of switch 62 when cathode 62C is pulsed negatively by signal transistor 54. Resistance 104 (1.8 kilohms) is a load for switch 62 to establish a holding current and also provides a return path for capacitor 76. Diode 106 (1N4001) prevents anode 62A from going more negative than -0.7 volts with respect to common L2 during turnoff. Resistor 108 (100 ohms) and capacitor 110 (50 microfarads) are power-supply decoupling elements for the pulse former 8 and the accumulator 10. Resistor 112 (33 ohms) and capacitor 114 (50 microfarads) decouple the output generator 14.

Figure 4:
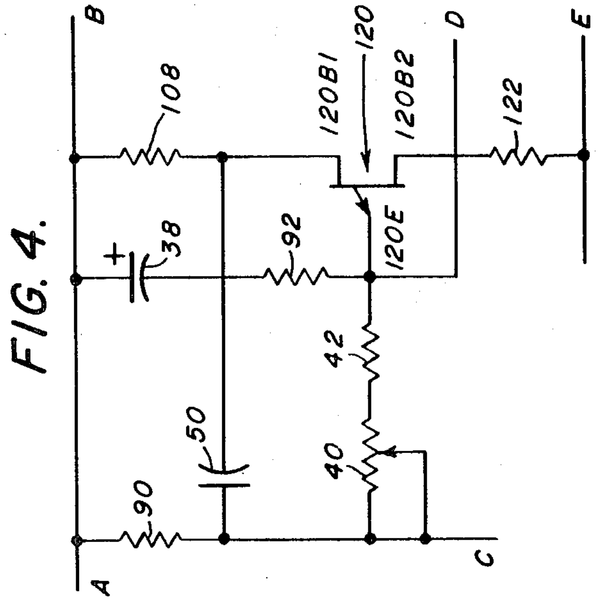
FIG. 4 is a schematic diagram of a modification to the pulse accumulator for counting large numbers.

Referring now to FIG. 4, alternative circuitry is provided for pulse former 8 and pulse accumulator 10 insertable at indicated points A, B, C, D and E to accommodate those applications where large counting numbers are involved. By referring also to FIG. 3 it will be seen that the modification contemplates the removal of breakover diode 48 from the circuitry and the substitution according to FIG. 4 of a unijunction transistor such as a D5K1 or D5K2. Emitter 120E is coupled to the circuit at the point where the cathode of diode 48 was and base 120B1 is coupled between accumulator capacitor 51 and biasing resistor 108, eliminating load resistor 46 for diode 48. Base 120B2 is connected at E to the common through a biasing resistor 122 (680 ohms). Transistor 120 provides accuracy to higher count rates because of greater time and temperature stability which results in greater repeatability of pulse height and duration.

In the operation of the counter disclosed, a programming resistor multiple of 10 kilohms provides a variance in the counting event of one unit. Thus, for a programming resistor 12 of a value of 80 kilohoms, the event signaled by the output generator 14 will be a count of 8 . The variable resistor 40 provides ability to center the pulse width of the pulse former 8 in order to achieve proper charge accumulation per pulse that will provide an output from the generator 14 on the eight pulse. Ideally, the last pulse of the chain for the event should trigger the output during the midpoint of its duration. This permits some drift of pulses within the counter, allowing stability of the event without causing a miscount. Capacitor 64 and resistor 66 determine the width of the output pulse of the output generator 14. It will be recognized that the values of these components may be varied to suit the user's needs. In like manner the values of the input delay and filter section 2 may also be varied by conventionally known means to suit the application of the user.

It will be recognized that numerous variations and modifications may be made to the disclosed circuitry without departing from the scope of the invention hereinafter claimed.

We claim:

1. An electronic analog counter having input terminal means to which pulses to be counted are applied and adapted to produce an output pulse whenever a predetermined number of pulses are applied to said input terminal means, said counter comprising:

pulse-forming means electrically connected to said input terminal means for producing a pulse of essentially fixed width and height each time an input pulse is applied to said input terminal means;

integrating pulse-accumulator means coupled to said pulse-forming means and including an integrating capacitor provided with a charging path which incorporates variable resistance means whereby the number of pulses required to charge said capacitor to a predetermined voltage level can be varied by varying the resistance of said variable resistance means;

an output generator for producing said output pulse, said generator being coupled to said integrating capacitor and including a switch device which is triggered to produce said output signal when the voltage across said integrating capacitor reaches said predetermined level, and a feedback path connecting said output generator to said pulse-forming means to disable the pulse-forming means during the occurrence of an output pulse to prevent input pulses from charging said integrating capacitor during the occurrence of said output pulse.

2. The counter of claim 1 wherein said pulse-forming means includes a semiconductive controlled rectifier and a breakover diode.

3. The counter of claim 2 wherein said pulse forming means additionally includes a capacitor, circuit means connecting said semiconductive controlled rectifier to said input terminal means whereby the semiconductive controlled rectifier is fired each time a pulse is applied to said input terminal means, circuit means connecting said semiconductive controlled rectifier to said last-mentioned capacitor, circuit means connecting said last-mentioned capacitor to said breakover diode such that the diode will fire to produce a spike when the voltage across the last-mentioned capacitor reaches a level at which the diode will fire, and means for causing cutoff of said semiconductive controlled rectifier when the breakover diode fires.

4. The counter of claim 3 wherein said pulses of essentially fixed width and height are derived from a terminal of said semiconductive controlled rectifier.

5. The counter of claim 4 wherein said variable resistance means is connected between said integrating capacitor and said terminal of the semiconductive controlled rectifier.

6. The counter of claim 1 wherein said output generator includes a unijunction transistor coupled to said integrating capacitor.

7. The counter of claim 6 wherein said unijunction transistor is coupled to a semiconductive controlled rectifier and said feedback path connects a terminal of said semiconductive controlled rectifier to said pulse-forming means.

8. The counter of claim 7 wherein said pulse-forming means includes a second semiconductive controlled rectifier to which input pulses on said input terminal means are applied, and means including said feedback path for preventing said second semiconductive controlled rectifier from firing when the semiconductive controlled rectifier in said output generator is conducting.

9. The counter of claim 8 including a breakover diode in said output generator for forming said output pulse when the semiconductive controlled rectifier in said output generator fires.

* * * * *